United States Patent
Yan

(10) Patent No.: US 11,286,186 B2
(45) Date of Patent: Mar. 29, 2022

(54) METHOD FOR TREATING DYE WASTEWATER

(71) Applicant: XIAMEN UNIVERSITY OF TECHNOLOGY, Fujian (CN)

(72) Inventor: Bin Yan, Fujian (CN)

(73) Assignee: XIAMEN UNIVERSITY OF TECHNOLOGY, Fujian (CN)

(*) Notice: Subject to any disclaimer, the term of this patent is extended or adjusted under 35 U.S.C. 154(b) by 0 days.

(21) Appl. No.: 16/769,914

(22) PCT Filed: Apr. 30, 2019

(86) PCT No.: PCT/CN2019/085158
§ 371 (c)(1),
(2) Date: Jun. 4, 2020

(87) PCT Pub. No.: WO2020/015434
PCT Pub. Date: Jan. 23, 2020

(65) Prior Publication Data
US 2021/0269339 A1    Sep. 2, 2021

(30) Foreign Application Priority Data
Jul. 17, 2018    (CN) .......................... 201810785716.5

(51) Int. Cl.
*C02F 3/30*    (2006.01)
*C02F 3/12*    (2006.01)
(Continued)

(52) U.S. Cl.
CPC ............ *C02F 3/301* (2013.01); *C02F 3/1268* (2013.01); *C02F 3/2853* (2013.01); *C02F 3/342* (2013.01); *C02F 2101/308* (2013.01)

(58) Field of Classification Search
CPC ...... C02F 3/301; C02F 3/1268; C02F 3/2853; C02F 3/342; C02F 2101/308
(Continued)

(56) References Cited

U.S. PATENT DOCUMENTS 7,597,808 B2 * 10/2009 Shiotani ................. C02F 3/302
210/605
2018/0093228 A1    4/2018 Yan et al.

FOREIGN PATENT DOCUMENTS

CN    1544351 A    11/2004
CN    2915846 Y    6/2007
(Continued)

OTHER PUBLICATIONS

Machine-generated English translation of CN 103936146A, dated Jul. 15, 2021.*
(Continued)

*Primary Examiner* — Fred Prince
(74) *Attorney, Agent, or Firm* — Calfee Halter & Griswold LLP

(57) ABSTRACT

A method for treating dye wastewater includes: firstly, homogenizing the dye wastewater to balance the quality of the dye wastewater from different processes; then subjecting the homogenized dye wastewater to anaerobic treatment to remove most of chemical oxygen demand (COD) and total suspended solids (SS) in the wastewater; and finally subjecting the dye wastewater after the anaerobic treatment to circulating anaerobic-oxic treatment in a membrane bioreactor (MBR). In the present invention, the MBR is filled with a quinone-based hollow fiber membrane. The quinone acts as an electron mediator to accelerate an enzymatic reaction for dye decolorization during the anaerobic process, thereby achieving the purpose of efficient decolorization. The oxic treatment process further removes the COD and SS
(Continued)

in the wastewater, so that the effluent meets a first-level discharge standard.

11 Claims, 1 Drawing Sheet

(51) Int. Cl.
*C02F 3/28* (2006.01)
*C02F 3/34* (2006.01)
*C02F 101/30* (2006.01)

(58) Field of Classification Search
USPC .............................. 210/605, 603, 630, 917
See application file for complete search history.

(56) References Cited

FOREIGN PATENT DOCUMENTS

| | | | |
|---|---|---|---|
| CN | 101774690 A | | 7/2010 |
| CN | 102260009 B | * | 1/2013 |
| CN | 103265151 A | | 8/2013 |
| CN | 103724668 A | | 4/2014 |
| CN | 103936146 B | | 5/2015 |
| CN | 205653227 U | | 10/2016 |
| CN | 107055765 A | | 8/2017 |
| CN | 108911134 A | | 11/2018 |
| CN | 108911136 A | | 11/2018 |
| CN | 108911137 A | | 11/2018 |
| JP | S62102896 A | | 5/1987 |
| JP | 11244877 A | | 9/1999 |
| JP | 2007152179 A | | 6/2007 |
| JP | 2013255919 A | | 12/2013 |
| JP | 2016013537 A | | 1/2016 |
| JP | 2017164739 A | | 9/2017 |
| KR | 20020094950 A | | 12/2002 |
| KR | 20170014568 A | | 2/2017 |
| WO | 2011059218 A2 | | 5/2011 |

OTHER PUBLICATIONS

Machine-generated English translation of CN 102260009B, dated Jul. 14, 2021.*
Search Report for International Application No. PCT/CN2019/085158 dated Jul. 16, 2019.
M r-4/4—(Li, Jingmei et al.). "A/ot.rfft7NBRA,wriwA71( (Decolorization of Dyeing Effluents with A/O Type Sequencing Batch MBR Method)" F 17 (Dyeing & Finishing), No. 3, Feb. 1, 2009 (Feb. 1, 2009), ISSN: 1000-4017.
Mr-4-4—(Li, Jingmei et al.). "HRTT,TA/Ot1fft7NIBR,IWP .*)A71( MIA (Influences of HRT on Dyeing Effluents Treatment with A/O Type Sequencing Batch MBR)" F 17 (Dyeing & Finishing), No. 16, Aug. 15, 2009 (Aug. 15, 2009), ISSN: 1000-4017.
English Translation of International Search Report from International Application No. PCT/CN2019/085159 dated Jul. 22, 2019 (2 pages).
English Translation of International Search Report from International Application No. PCT/CN2019/088534 dated Aug. 9, 2019 (3 pages).

* cited by examiner

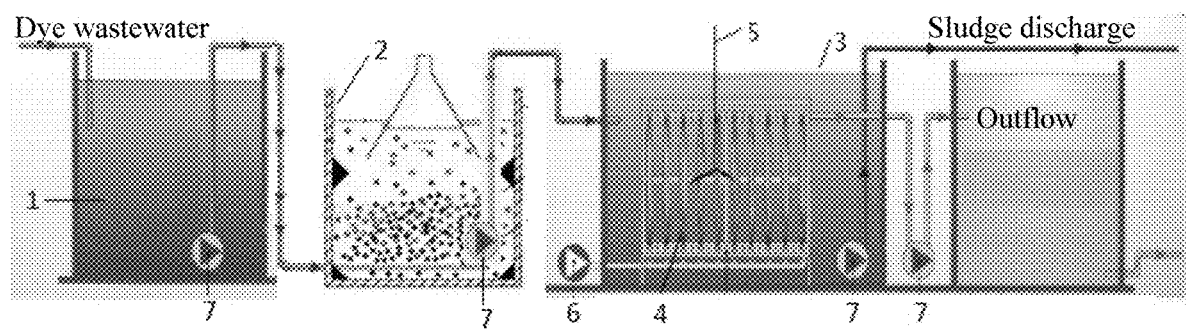

METHOD FOR TREATING DYE WASTEWATER

CROSS-REFERENCE TO RELATED APPLICATIONS

The present application is the National Stage of International Application No. PCT/CN2019/085158, filed on Apr. 30, 2019, which claims priority to the Chinese Patent Application No. 201810785716.5, filed with the China National Intellectual Property Administration (CNIPA) on Jul. 17, 2018, and entitled "METHOD FOR TREATING DYE WASTEWATER", which are incorporated herein by reference in their entireties.

TECHNICAL FIELD

The present invention relates to the technical field of wastewater treatment, and in particular to a method for treating dye wastewater.

BACKGROUND

Dyes are widely used in the fields of dyeing, coatings, pigments and textiles. Because dyes are complex in chemical structure, biologically toxic, and difficult to degrade with traditional methods, they become a major cause of water pollution. Printing and dyeing plants produce a lot of wastewater. The printing and dyeing of 1 t textile consumes 100-200 t water, of which 80-90% is discharged as wastewater. Dye-containing wastewater generally features large water volume, high organic pollutant content, large alkalinity and large changes in water quality, which makes it difficult to treat.

In China, the printing and dyeing wastewater is mainly treated by biological processes, among which the most widely used is oxic biological treatment, including surface accelerated aeration and contact oxidation. Oxic biological treatment has obvious removal effect on chemical oxygen demand (COD) and biochemical oxygen demand (BOD), achieving a removal rate of generally up to about 80%. However, it does not achieve efficient removal of chromaticity and COD. Simple oxic biological treatment is becoming increasingly difficult, and the effluent is hard to meet the standard. In view of the above, attention has been paid to the anaerobic biological treatment process, and the anaerobic biological process is gradually introduced into the treatment of printing and dyeing wastewater. The current wastewater treatment often combines anaerobic and oxic processes. The front-end anaerobic process generally uses configurations such as upflow anaerobic sludge blanket (UASB) reactor and anaerobic baffled reactor (ABR), and the back-end oxic process generally adopts activated sludge process (ASP). They can remove most of the COD, BOD and total suspended solids (SS) in the water body to meet the discharge requirements. The above decolorization process of dye-containing wastewater is mainly a biochemical reduction process (enzymatic reaction process), and the reduction process of chemical bonds is a process of limiting the reaction speed. Therefore, the current anaerobic-oxic process is still difficult to achieve good removal effect on the chromaticity of wastewater, and physical and chemical treatment is needed in case of high requirements for the chromaticity of the effluent.

SUMMARY

In order to overcome the above shortcomings of the prior art, the present invention provides a method for treating dye wastewater with high decolorization rate and good effect.

To achieve the above purpose, the present invention provides the following technical solution.

A method for treating die wastewater includes the following steps:

homogenizing the dye wastewater in an equalization tank;

subjecting the homogenized dye wastewater to anaerobic treatment in an anaerobic tank; and subjecting the dye wastewater after the anaerobic treatment to circulating anaerobic-oxic treatment in a membrane bioreactor (MBR) filled with a quinone-based hollow fiber membrane.

Preferably, the quinone-based hollow fiber membrane in the MBR has a running flux of 10 L/(m$^2$·h) and an average pore size of 0.1 μm.

Preferably, the quinone-based hollow fiber membrane includes greater than 5% by mass of quinone.

Preferably, a sludge concentration in the MBR is 6,000-7,000 mg/L.

Preferably, the dye wastewater has a hydraulic retention time (HRT) of greater than or equal to 10 h in the equalization tank.

Preferably, the sludge concentration in the anaerobic reactor is greater than 8,000 mg/L.

Preferably, the homogenized dye wastewater has an HRT of greater than or equal to 8 h in the anaerobic reactor.

Preferably, during the circulating anaerobic-oxic treatment, the time of single anaerobic treatment is 1.5-2.5 h, and the time of single oxic treatment is 40-60 min.

Preferably, dissolved oxygen (DO) in the oxic treatment is 2-4 mg/L.

Preferably, a redox potential in the anaerobic treatment is less than or equal to −300 mV.

Preferably, the dye wastewater after the anaerobic treatment has an HRT of 11-13 h in the MBR.

The present invention provides a method for treating dye wastewater, including: firstly, homogenizing the dye wastewater to balance the quality of the dye wastewater from different processes; then subjecting the homogenized dye wastewater to anaerobic treatment to remove most of chemical oxygen demand (COD) and total suspended solids (SS) in the wastewater; and finally subjecting the dye wastewater after the anaerobic treatment to circulating anaerobic-oxic treatment in an MBR. During the anaerobic treatment, reductase from microorganisms degrades a dye, and a mediator substance accelerates the reaction process. Based on this basic principle, the MBR of the present invention is filled with a quinone-based hollow fiber membrane. The quinone in the fiber membrane accelerates the enzymatic reaction for dye decolorization during the anaerobic process, thereby achieving the purpose of efficient decolorization. The oxic treatment process further removes the COD and SS in the wastewater, so that the effluent meets a first-level discharge standard. The results of the examples show that by treating the dye wastewater by the method provided by the present invention, the COD in the effluent is less than 100 mg/L, the chromaticity is less than 20 times, and the SS is 0.

BRIEF DESCRIPTION OF DRAWINGS

FIG. 1 is a flowchart of treating dye wastewater according to an example of the present invention.

REFERENCE NUMERALS 1. equalization tank; 2. anaerobic reactor; 3. MBR; 4. quinone-based hollow fiber membrane; 5. agitator; 6. aeration device; and 7. pump.

DETAILED DESCRIPTION

The present invention is further described below with reference to the accompanying drawings and examples.

The present invention provides a method for treating dye wastewater, including the following steps:
homogenize the dye wastewater in an equalization tank;
subject the homogenized dye wastewater to anaerobic treatment in an anaerobic tank; and
subject the dye wastewater after the anaerobic treatment to circulating anaerobic-oxic treatment in an MBR filled with a quinone-based hollow fiber membrane.

The present invention homogenizes the dye wastewater in an equalization tank. The present invention has no special requirement for the source of the dye wastewater, and wastewater generated in various steps in the dye production or dyeing process can be treated by the method of the present invention. In the present invention, the chromaticity of the dye wastewater is 300-800 times, the COD is 1,000-8,000 mg/L, and the total suspended solids (SS) is 100-700 mg/L.

In the present invention, the HRT of the dye wastewater in the equalization tank is preferably greater than 10 h, and more preferably 12-15 h. The present invention has no special requirement for the inflow rate of the dye wastewater, and an inflow rate that can discharge the dye wastewater into the equalization tank for homogenization can be used.

In the present invention, the dye wastewater from various steps is homogenized in the homogenization tank to balance the chromaticity, density and COD of the water quality. The present invention has no special requirement for the volume of the equalization tank. In a specific example of the present invention, the volume of the equalization tank is preferably determined according to the amount of wastewater to be treated.

After the homogenization is completed, the present invention subjects the homogenized dye wastewater to anaerobic treatment in an anaerobic tank. In the present invention, the HRT of the homogenized dye wastewater in the anaerobic reactor is preferably greater than 8 h, and more preferably 10-12 h. The sludge concentration in the anaerobic reactor is preferably greater than 8,000 mg/L, more preferably 10,000 mg/L. The redox potential in the anaerobic treatment stage is preferably less than −100 mV, and more preferably −200 mV to −300 mV. The present invention has no special requirement for the anaerobic reactor (an upflow anaerobic sludge blanket (UASB) reactor), and an anaerobic reactor well known to those skilled in the art can be used.

The present invention utilizes the anaerobic treatment to degrade the organic matter in the dye wastewater. The present invention decomposes the high molecular weight organic matter in the wastewater into low molecular weight organic matter, thereby removing most of the COD in the wastewater. The present invention also reduces, degrades and decolorizes some azo dyes to preliminarily reduce the chromaticity of the dye wastewater.

The present invention then subjects the dye wastewater after the anaerobic treatment to circulating anaerobic-oxic treatment in an MBR. In the present invention, the MBR is an anaerobic-oxic membrane bioreactor (AOMBR). The AOMBR is filled with a quinone-based hollow fiber membrane. The AOMBR is provided with an agitator in the center for agitating during the anaerobic treatment process. The AOMBR is also provided with an aeration device at the bottom for aerating to provide oxygen for the oxic treatment process. In the present invention, the circulation of the dye wastewater between the equalization tank, the anaerobic reactor and the MBR is preferably realized by a pump.

In the present invention, the MBR is filled with a quinone-based hollow fiber membrane. The running flux of the quinone-based hollow fiber membrane is preferably greater than or equal to 10 L/(m$^2$·h), and more preferably 10-15 L/(m$^2$·h). The quinone-based hollow fiber membrane includes preferably greater than 5%, more preferably 10-15% by mass of quinone. The average pore diameter of the quinone-based hollow fiber membrane is preferably 0.1 µm. In a specific example of the present invention, 1 m$^2$ area of membrane filament filters at least 10 L of wastewater in 1 h. The present invention preferably determines the total area of the hollow fiber membrane according to the amount of the dye wastewater to be treated. The present invention has no special requirement for the source of the quinone-based hollow fiber membrane, and that purchased directly or prepared can be used. In a specific example of the present invention, the quinone-based hollow fiber membrane can specifically be an anthraquinone functionalized polyvinylidene fluoride membrane, which can be prepared according to a method well known to those skilled in the art. The present invention has no special requirement for the filling method of the quinone-based hollow fiber membrane, and a filling method well known to those skilled in the art can be used.

In the present invention, the sludge concentration in the MBR is preferably 6,000-7,000 mg/L, and more preferably 6,500 mg/L. The present invention has no special requirement for the type of the sludge, and sewage treatment sludge well known to those skilled in the art can be used.

The present invention has no special requirement for the inflow rate of the wastewater after the anaerobic treatment in the MBR. In a specific example of the present invention, the specific inflow rate is determined according to factors such as the amount of the wastewater to be treated and the cross-sectional area of an inlet pipe.

In the present invention, the sewage after the anaerobic treatment is firstly subjected to anaerobic treatment and then oxic treatment in the MBR, and the treatment is sequentially cycled. In the present invention, during the circulating anaerobic-oxic treatment, the time of single anaerobic treatment is preferably 1.5-2.5 h, and more preferably 2 h. The redox potential in the anaerobic treatment is preferably less than or equal to −300 mV, and more preferably −600 mV to −400 mV. The present invention preferably performs the anaerobic treatment while agitating at the speed of preferably 5 rpm or less, and more preferably 3-4 rpm. In the present invention, the sludge is suspended in the water by agitating to fully contact with the quinone-based hollow fiber membrane, so as to avoid the reduction of the reaction efficiency due to sludge deposition. The present invention preferably provides a hydraulic agitator in the MBR. In order to avoid touching the hollow fiber membrane during the agitating process, the present invention preferably fills the hollow fiber membrane around the MBR and disposes the hydraulic agitator in the center of the MBR.

The reductase included in the microorganism causes the dye to undergo a reduction reaction (an enzymatic reaction). The quinone included in the hollow fiber membrane provided by the present invention acts as an electron mediator to accelerate the enzymatic reduction process during the anaerobic treatment, for example, the process of breaking double bonds of the azo dye. The present invention achieves the purpose of efficient decolorization by accelerating the progress of the enzymatic reaction. In addition, the present invention implements the anaerobic treatment to degrade the remaining organic matter in the dye wastewater, thereby further reducing the COD of the wastewater.

In the present invention, during the circulating anaerobic-oxic treatment, the time of single oxic treatment is preferably 40-60 min, and more preferably 50 min. The dissolved oxygen (DO) in the oxic treatment is preferably 2-4 mg/L, and more preferably 3 mg/L. The present invention preferably aerates to provide oxygen for the oxic treatment. The aeration process causes the sewage to be agitated, so the oxic treatment process does not need an agitator. The present invention preferably provides an aeration device at the bottom of the MBR. The present invention has no special requirement for the aeration device, and an aeration device well known to those skilled in the art can be used to provide oxygen for the oxic treatment. During the oxic treatment process, the low molecular weight organic matter in the dye wastewater is decomposed into inorganic matter, which further reduces the COD of the wastewater.

In the present invention, the HRT of the wastewater after the anaerobic treatment in the MBR is preferably 11-13 h, and more preferably 12 h. During the HRT, the circulating anaerobic-oxic treatment is performed for more than 3 cycles.

In a specific example of the present invention, after the anaerobic treatment, the wastewater is preferably first subjected to the anaerobic treatment in the MBR. The aeration device is turned off and the agitator is turned on to perform the anaerobic treatment for 1.5-2.5 h. Then the agitator is turned off and the aeration device is turned on to perform the oxic treatment for 40-60 min. Then the anaerobic treatment is performed, and the operations are repeated until the HRT of the wastewater in the MBR reaches 11-13 h. The wastewater is discharged after the treatment. In the present invention, the wastewater is preferably discharged in the oxic treatment stage. The aeration treatment in the oxic treatment stage causes the membrane filament to be agitated, so the sludge is not easy to adhere to the surface of the membrane filament when the wastewater is discharged. In the anaerobic treatment stage, since the agitating force on the membrane filament is insufficient, the sludge will adhere to the surface of the membrane filament when the wastewater is discharged, causing pollution of the membrane filament and affecting the outflow rate.

The wastewater treatment process of the present invention is shown in FIG. 1. The dye wastewater flows through the equalization tank 1 for homogenization. The homogenized wastewater enters the anaerobic reactor (UASB) 2 for anaerobic treatment. After the anaerobic treatment, the wastewater enters into the MBR (AOMBR) 3 for circulating anaerobic-oxic treatment. The MBR is filled with the quinone-based hollow fiber membrane 4. During the anaerobic treatment, the agitator 5 is turned on and the aeration device 6 is turned off. During the oxic treatment, the agitator 5 is turned off and the aeration device 6 is turned on. After the circulating treatment, the sewage that meets the standard is led through a suction pump to a discharge port of the sewage treatment system for discharge. During the treatment process, a pump 7 is used to realize the circulation of the wastewater. The present invention has no special requirement for the treatment method of the sludge in the MBR, and a treatment method well known to those skilled in the art can be used. In a specific example of the present invention, the sludge is preferably regularly discharged to ensure the effect of wastewater treatment.

The solutions provided by the present invention are described in detail below with reference to the examples, but the examples should not be construed as a limitation to the protection scope of the present invention.

Example 1

In the dye wastewater, the initial COD was 6,000 mg/L, the initial chromaticity was 200 times, and the initial SS was 600 mg/L.

The dye wastewater was first homogenized in an equalization tank, where the HRT of the dye wastewater was 12 h.

After the treatment in the equalization tank, the dye wastewater entered an anaerobic reactor (UASB) for anaerobic treatment, where the HRT was 10 h, the redox potential in the anaerobic treatment process was −230 mV, and the sludge concentration was 8 g/L.

After the anaerobic treatment, the dye wastewater entered an AOMBR for circulating anaerobic-oxic treatment. The reactor was filled with a membrane filament, which was a quinone-based hollow fiber membrane. The sludge concentration in the AOMBR was 6,000 mg/L. The AOMBR performed anaerobic treatment by hydraulically agitating for 2 h at the redox potential of −350 mV (without aeration). Then the AOMBR performed oxic treatment for 50 min by aerating and controlling the DO to be 3 mg/L (without agitation). In the oxic treatment process, the HRT was 12 h, and the wastewater was discharged through the membrane filament after meeting the standard.

The COD, chromaticity and SS in the dye wastewater after treatment were tested, as shown in Table 1.

TABLE 1

Changes in the quality of dye wastewater before and after treatment

| | Process | UASB | AOMBR |
|---|---|---|---|
| Inflow | COD (mg/L) | 6000 | <1500 |
| | Chromaticity (dilution ratio) | 200 | 100 |
| | SS (mg/L) | 600 | 200 |
| Outflow | COD (mg/L) | 1500 | <100 |
| | Chromaticity (dilution ratio) | 100 | <20 |
| | SS (mg/L) | 200 | 0 |

Table 1 shows that the COD, chromaticity and SS in the untreated dye wastewater were very high, while the COD, chromaticity and SS in the wastewater treated by the anaerobic reactor were reduced. After the treatment by the AOMBR, the COD in the effluent was less than 100 mg/L, the chromaticity was less than 20 times, and the SS was completely removed. The effluent met a first-level discharge standard. It can be seen that the method for treating dye wastewater provided by the present invention achieves the purpose of efficient decolorization, and has excellent removal effect on the COD and SS.

Example 2

In the dye wastewater, the initial COD was 3200 mg/L, the initial chromaticity was 300 times, and the initial SS was 300 mg/L.

The dye wastewater was first homogenized in an equalization tank, where the HRT of the dye wastewater was 12 h.

After the treatment in the equalization tank, the dye wastewater entered an anaerobic reactor (UASB) for anaerobic treatment, where the HRT was 12 h, the redox potential in the anaerobic treatment process was −200 mV, and the sludge concentration was 8 g/L.

After the anaerobic treatment, the dye wastewater entered an AOMBR for circulating anaerobic-oxic treatment. The reactor was filled with a membrane filament, which was a quinone-based hollow fiber membrane. The sludge concentration in the AOMBR was 7,500 mg/L. The AOMBR performed anaerobic treatment by hydraulically agitating for 2 h at the redox potential of −400 mV (without aeration). Then the AOMBR performed oxic treatment for 50 min by aerating and controlling the DO to be 2.5 mg/L (without agitation). In the oxic treatment process, the HRT was 12.5 h, and the wastewater was discharged through the membrane filament after meeting the standard.

The COD, chromaticity and SS in the dye wastewater after treatment were tested, as shown in Table 2.

TABLE 2

Changes in the quality of dye wastewater before and after treatment

| | Process | UASB | AOMBR |
|---|---|---|---|
| Inflow | COD (mg/L) | 3200 | 1000 |
| | Chromaticity (dilution ratio) | 300 | 80 |
| | SS (mg/L) | 300 | 100 |
| Outflow | COD (mg/L) | 1000 | <100 |
| | Chromaticity (dilution ratio) | 80 | <20 |
| | SS (mg/L) | 100 | 0 |

Table 2 shows that the COD in the treated dye wastewater was less than 100 mg/L, the chromaticity was less than 20 times, and the SS was completely removed. It can be seen that the method for treating dye wastewater provided by the present invention achieves the purpose of efficient decolorization, and has excellent removal effect on the COD and SS.

The above description of the examples is intended to help understand the method and core idea of the present invention. It should be noted that, several improvements and modifications may be made by persons of ordinary skill in the art without departing from the principle of the present invention, and these improvements and modifications should also be considered within the protection scope of the present invention. Various modifications to these examples are readily apparent to persons skilled in the art, and the generic principles defined herein may be practiced in other examples without departing from the spirit or scope of the invention. Thus, the present invention is not limited to the examples shown herein but falls within the widest scope consistent with the principles and novel features disclosed herein.

What is claimed is:

1. A method for treating dye wastewater, comprising the following steps:
   homogenizing the dye wastewater in an equalization tank;
   subjecting the homogenized dye wastewater to anaerobic treatment in an anaerobic tank; and
   subjecting the dye wastewater after the anaerobic treatment to circulating anaerobic-oxic treatment in a membrane bioreactor (MBR) filled with a quinone-based hollow fiber membrane, wherein the quinone-based hollow fiber membrane comprises greater than 5% by mass of quinone.

2. The treatment method according to claim 1, wherein the quinone-based hollow fiber membrane in the MBR has a running flux of 10 L/(m²·h) and an average pore size of 0.1 µm.

3. The treatment method according to claim 1, wherein a sludge concentration in the MBR is 6,000-7,000 mg/L.

4. The treatment method according to claim 1, wherein the dye wastewater has a hydraulic retention time (HRT) of greater than or equal to 10 h in the equalization tank.

5. The treatment method according to claim 4, wherein the homogenized dye wastewater has an HRT of greater than or equal to 8 h in the anaerobic tank.

6. The treatment method according to claim 1, wherein the anaerobic tank has a sludge concentration of greater than 8,000 mg/L.

7. The treatment method according to claim 1, wherein the homogenized dye wastewater has an HRT of greater than or equal to 8 h in the anaerobic tank.

8. The treatment method according to claim 1, wherein during the circulating anaerobic-oxic treatment, the time of single anaerobic treatment is 1.5-2.5 h, and the time of single oxic treatment is 40-60 min.

9. The treatment method according to claim 8, wherein dissolved oxygen (DO) in the oxic treatment is 2-4 mg/L.

10. The treatment method according to claim 8, wherein a redox potential in the anaerobic treatment is less than or equal to −300 mV.

11. The treatment method according to claim 1, wherein the dye wastewater after the anaerobic treatment has an HRT of 11-13 h in the MBR.

* * * * *